United States Patent
Otto et al.

(10) Patent No.: US 10,335,639 B2
(45) Date of Patent: Jul. 2, 2019

(54) THREADED TREE STEP TOOL

(71) Applicant: Hunter Pro Technologies, LLC, Grand Forks, ND (US)

(72) Inventors: Kruse Otto, Jamestown, ND (US); Michael Kangas, Cleveland, OH (US); Nicholas Boonstra, North Oakdale, MN (US); Austin Kemmer, Fargo, ND (US)

(*) Notice: Subject to any disclaimer, the term of this patent is extended or adjusted under 35 U.S.C. 154(b) by 311 days.

(21) Appl. No.: 15/055,434

(22) Filed: Feb. 26, 2016

(65) Prior Publication Data

US 2016/0250521 A1    Sep. 1, 2016

Related U.S. Application Data (60) Provisional application No. 62/126,584, filed on Feb. 28, 2015.

(51) Int. Cl.
  *A63B 27/02*  (2006.01)
  *A63B 27/00*  (2006.01)
  *A01M 31/02*  (2006.01)

(52) U.S. Cl.
  CPC ............ *A63B 27/00* (2013.01); *A01M 31/02* (2013.01); *A63B 27/02* (2013.01)

(58) Field of Classification Search
  CPC .............................. A01M 31/02; A63B 27/00
  See application file for complete search history.

(56) References Cited

U.S. PATENT DOCUMENTS

| | | | | |
|---|---|---|---|---|
| 3,729,160 A | * | 4/1973 | D'Imperio | A01M 31/02 108/152 |
| 4,413,706 A | * | 11/1983 | Michael | A63B 27/00 182/91 |
| 4,669,575 A | * | 6/1987 | Skyba | A63B 27/00 182/92 |
| 4,697,669 A | * | 10/1987 | Bergsten | E06C 9/04 182/189 |
| 4,700,807 A | * | 10/1987 | Kubiak | A63B 27/00 182/189 |
| 5,624,007 A | * | 4/1997 | Mahaffy | A63B 27/00 182/90 |

(Continued)

*Primary Examiner* — Rick K Chang
(74) *Attorney, Agent, or Firm* — Michael J. Sullivan (57) ABSTRACT

An installation tool for tree steps is disclosed allowing for one-handed operation through inserting the tool onto the tree step in either a perpendicular or parallel orientation to the tree step, with the orientation of the tree step to the tool chosen based on the amount of torque desired when installing and removing a tree step. The tool is placed onto the tree step in a parallel orientation by placing the platform portion of the tree step inside the tool's central cylindrical cavity. The tool is placed onto the tree step in a perpendicular orientation by placing the platform portion of the tree step inside the tool's slot-and-lock system and securing the lever portion of the tree step against one of the slots using a groove cut into the tool's main body. This perpendicular orientation effectively extends the lever portion of the tree step and provides additional leverage to the user. The tree step is additionally ergonomic through the use of such features to aid in gripping the tool as a thermoplastic polymer to reduce friction between the user and the tool, a palm swell, and a textured handle surface.

11 Claims, 7 Drawing Sheets

(56) References Cited

U.S. PATENT DOCUMENTS

| | | | | |
|---|---|---|---|---|
| 5,743,353 A * | 4/1998 | Browning | ............... | A63B 27/00 |
| | | | | 182/92 |
| 5,806,625 A * | 9/1998 | Katz | ...................... | A63B 27/00 |
| | | | | 182/129 |
| 5,899,124 A * | 5/1999 | Cross, Jr. | ............. | B25B 13/5091 |
| | | | | 81/124.4 |
| 6,729,437 B1 * | 5/2004 | Apple | ..................... | A63B 27/00 |
| | | | | 182/91 |
| 6,957,717 B1 * | 10/2005 | White | ........................ | B25C 1/10 |
| | | | | 182/127 |
| 7,017,449 B1 * | 3/2006 | Ritchings | ............ | B25B 13/5091 |
| | | | | 182/92 |
| 7,134,524 B2 * | 11/2006 | Sprague | ................. | A01M 31/00 |
| | | | | 182/92 |
| 7,231,853 B1 * | 6/2007 | Burdge | ................... | A63B 27/00 |
| | | | | 7/143 |
| 7,258,045 B2 * | 8/2007 | Smith | ..................... | B25B 13/48 |
| | | | | 182/92 |
| 8,230,765 B1 * | 7/2012 | Cooley | ............... | B25B 13/5091 |
| | | | | 81/176.15 |
| 8,863,900 B1 * | 10/2014 | Bolinger | ................. | A63B 27/00 |
| | | | | 182/151 |
| 9,409,055 B1 * | 8/2016 | Niemela | ................ | A63B 27/00 |
| 2002/0029931 A1 * | 3/2002 | Bridges | ................ | A01G 23/099 |
| | | | | 182/92 |
| 2009/0045012 A1 * | 2/2009 | Mencl | .................... | A63B 27/00 |
| | | | | 182/92 |

* cited by examiner

THREADED TREE STEP TOOL

CROSS-REFERENCE TO RELATED APPLICATION

This application claims the benefit under 35 U.S.C. § 119(e) of U.S. Provisional Application No. 62/126,584, filed Feb. 28, 2015, which is incorporated herein by reference.

BACKGROUND OF THE INVENTION

The invention disclosed herein pertains generally to threaded tree steps used in hunting to gain access to elevated platforms in tree stands and the like, and specifically to a device to assist in the application of installing and removing of threaded tree steps with a one-hand operation.

Hunting has been around for millenia and presently still exists as a popular and widespread outdoor activity around the world. In the hunting industry there exists many devices that aid, enable, and enhance the wide range of hunting activities. In particular, in most situations it is desired to hunt from an elevation in a tree, using tree stands, to keep undetected from prey. Most tree stands are difficult to gain access to, and thus threaded tree steps are used in order to allow the hunter comfortable access to the desired elevation.

The process of installing and removing threaded tree steps can be an exhausting job. Having to spend undesired time and effort on installing and removing threaded tree steps can cause hunters to become frustrated. Currently, hunters have several options for threaded tree step installation and removal. Operators of threaded tree steps can either install and remove them by hand, which can cause fatigue to one's body from the rough surface of the threaded tree step foot section and the work required to install and remove the steps. Second, operators may install or remove threaded tree steps with gloves on, which has the risk that a glove may be tangled around the rough surface of the threaded tree step, thereby causing difficult and time-consuming operation. Finally, operators of threaded tree steps may also use the assistance of other devices to make the process easier, but such existing devices have not solved certain remaining problems. The difficulties associated with the current methods of properly installing and removing threaded tree steps result in such issues as: (i) hunters using insufficient effort and not properly installing the tree steps, (ii) using too few steps for getting to the stand, (iii) requiring the use of both hands when one hand would ideally be carrying other equipment up the tree, (iv) abandoning installed tree steps due to the difficulty of removing the steps after hunting is complete, (v) the inability to easily pack-in the devices, and (vi) fatigue and damage to the user's hand, arm, and body.

As stated above, there are current attempts to improve the experience of the outdoors by making the installation and removal process of threaded tree steps easier for the operator. Attempts can be referenced from the following U.S. patents. U.S. Pat. No. 7,231,853 by Burdge, describes a tree step installation tool. The Burdge device uses a handle system to attach to various tree steps to install and remove by means of a longer lever arm. U.S. Pat. No. 8,230,765 by Cooley and U.S. Pat. No. 7,258,045 by Smith each similarly describe tree step installation tools that rely on the use of a longer lever arm.

Although, these devices are similar and complete their specific objectives, they all leave unresolved one or more of the above-identified issues with installing and removing threaded tree steps. Most of these devices are still time consuming and do not allow for proper operation using one hand. Each such device is difficult to grip and is not ergonomic. Such devices do not make for easy packing into the woods.

U.S. Pat. No. 6,729,437 by Apple, describes yet another type of tree step tool. The Apple device provides a handle axially aligned with the tree step and allows for impact to start inserting the step into a tree. Unfortunately, the device only aids in the starting of the tree step, which is only the first part of the process. Also, it is not ergonomic and requires more than one hand to operate.

What is needed in the art is an easy-to-carry system for properly installing and removing tree steps that allows the operation to be done with the use of one hand during the entire process, without the requirement of bulky and unnecessary parts and tools, and which focuses on the ergonomics of the user and provides the user with little to no interference between the user and the tree step.

SUMMARY OF THE INVENTION

The present invention is a tree step installation tool that solves the above-identified issues that remained unsolved despite the disclosure of previous similar tools. The installation tool disclosed herein allows for one-handed operation through inserting the tool onto the tree step in either a perpendicular or parallel orientation to the tree step, with the orientation of the tree step to the tool chosen based on the amount of torque desired when installing and removing a tree step. The tool is placed onto the tree step in a parallel orientation by placing the platform portion of the tree step inside the tool's central cylindrical cavity. The tool is placed onto the tree step in a perpendicular orientation by placing the platform portion of the tree step inside the tool's slot-and-lock system and securing the lever portion of the tree step against one of the slots using a groove cut into the tool's main body. This perpendicular orientation effectively extends the lever portion of the tree step and provides additional leverage to the user. The tree step is additionally ergonomic through the use of such features to aid in gripping the tool as a thermoplastic polymer to reduce friction between the user and the tool, a palm swell, and a textured handle surface.

REFERENCE NUMERALS

10 Tree step installation tool
12 Main body
14 Raised lip
16 Top slot
18 Bottom slot
20 Sloped protruding lip face
22 Palm swell
24 Textured handle surface
26 Contoured front cavity opening
28 Handle groove
30 Interior lip-to-handle surface
32 Beveled interior cavity
34 Central cylindrical interior cavity
36 Threaded tree step
38 Lever portion
40 Non-threaded step platform
42 Off-axis end
44 Threaded end

DETAILED DESCRIPTION OF THE INVENTION

Figure 1:
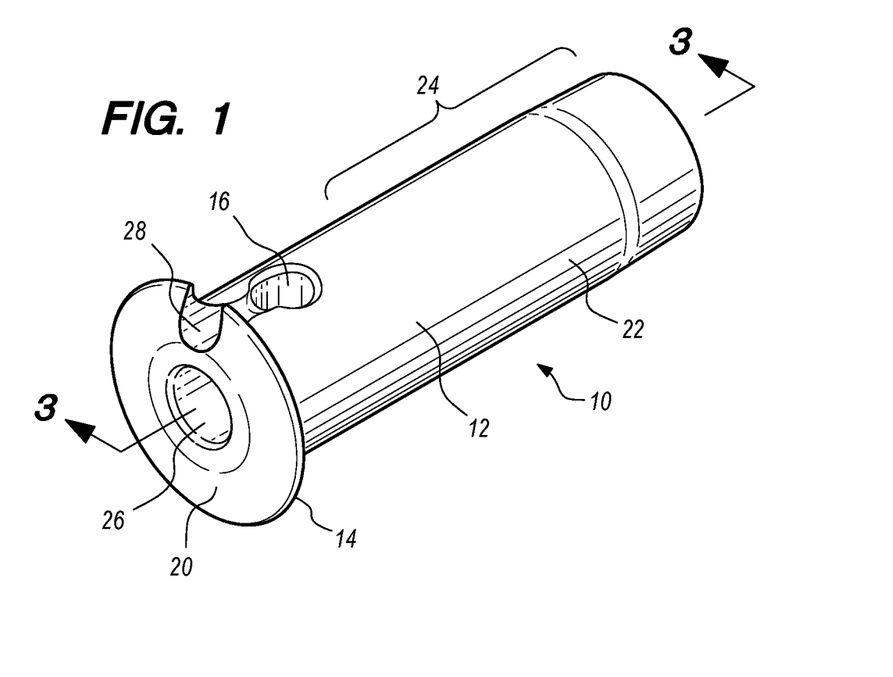
FIG. 1 is a perspective view of one embodiment of a threaded tree step installation tool.

Referring now to the invention in more detail, FIG. 1 is a perspective view of one embodiment of a threaded tree step installation tool that reduces the effort required to install threaded tree steps. A tool 10 includes a main body 12, raised lip 14, a slot-and-lock system with a top slot 16, a sloped protruding lip face 20, a palm swell 22, a textured handle surface 24, a contoured front cavity opening 26, and a handle groove 28.

Figure 2:
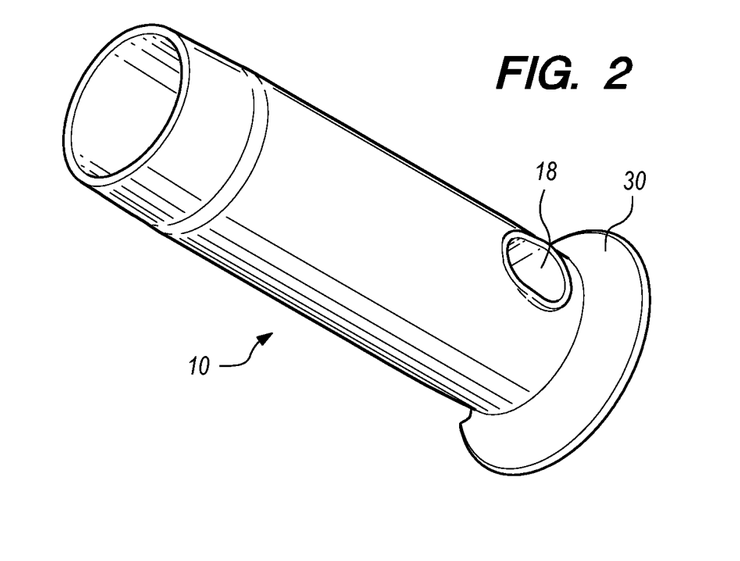
FIG. 2 is a perspective view of the tool from another angle.

Now referring to FIG. 2, a perspective view of the tool 10 is shown from a different angle. This view additionally shows the bottom slot 18 and rounded interior lip-to-handle surface 30.

Figure 3:
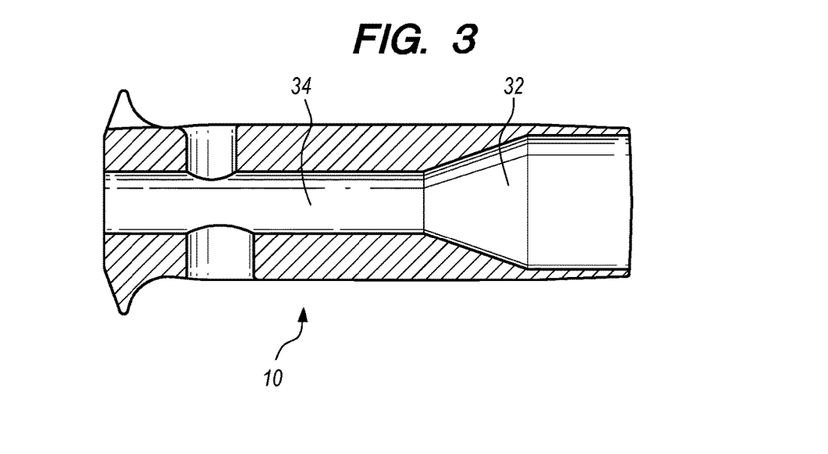
FIG. 3 is a view of a cross-section of the tool along the tool's longer axis.

Now referring to FIG. 3, a view of a cross-section of the tool along the tool's longer axis is shown. This view additionally shows the beveled interior cavity 32 and central cylindrical interior cavity 34.

The tool 10 is ideally composed of a thermoplastic polymer such as an Acetyl based polymer (or ABS), or any suitable material to provide a low friction interface between the tree step surface and the user's hand or garment. Although the preferred embodiment uses an ABS for the tool 10, any appropriate material that will reduce friction between the user's hand or garment and the tool 10 can be used.

The raised lip 14 provides a barrier intended to prevent the user's hand or garment from contacting the lever portion 38 of the tree step 36 (with the tree step first shown in FIG. 4), and also provides a surface for the user to apply more horizontal force toward the tree.

The purpose of the rounded interior lip-to-handle surface 30 is to better accommodate the shape of the user's hand. It is intended to provide a more comfortable and ergonomic user experience when operating the tool 10.

The beveled interior cavity 32 is intended to provide room for the off-axis portion 42 of the step platform 40 to rotate freely inside the tool, and also to provide a slight locking effect to keep the step 36 from sliding out of the tool 10 unintentionally.

Figure 8:
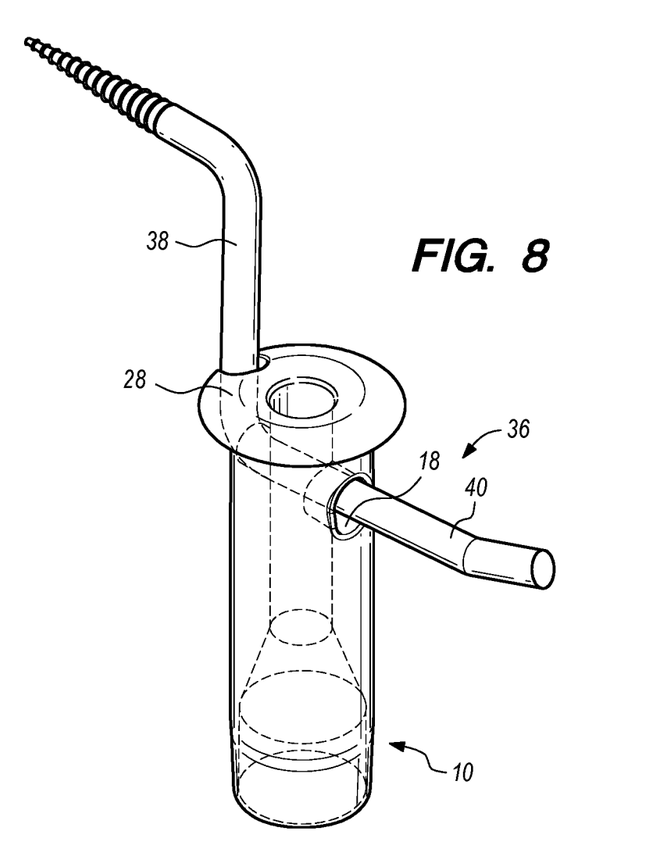
FIG. 8 is a diagram of the tool showing the tree step secured inside the tool using the method of insertion shown in FIG. 7.
Figure 9:
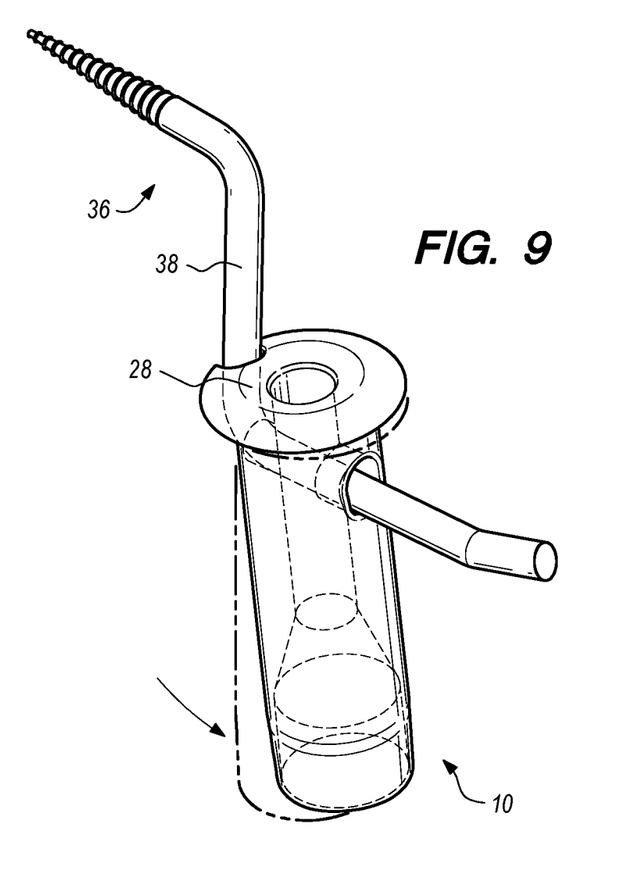
FIG. 9 is a diagram of the tool showing the further securing of the tree step inside the tool using the configuration shown in FIG. 8 by pulling on the far end of the tool.
Figure 10:
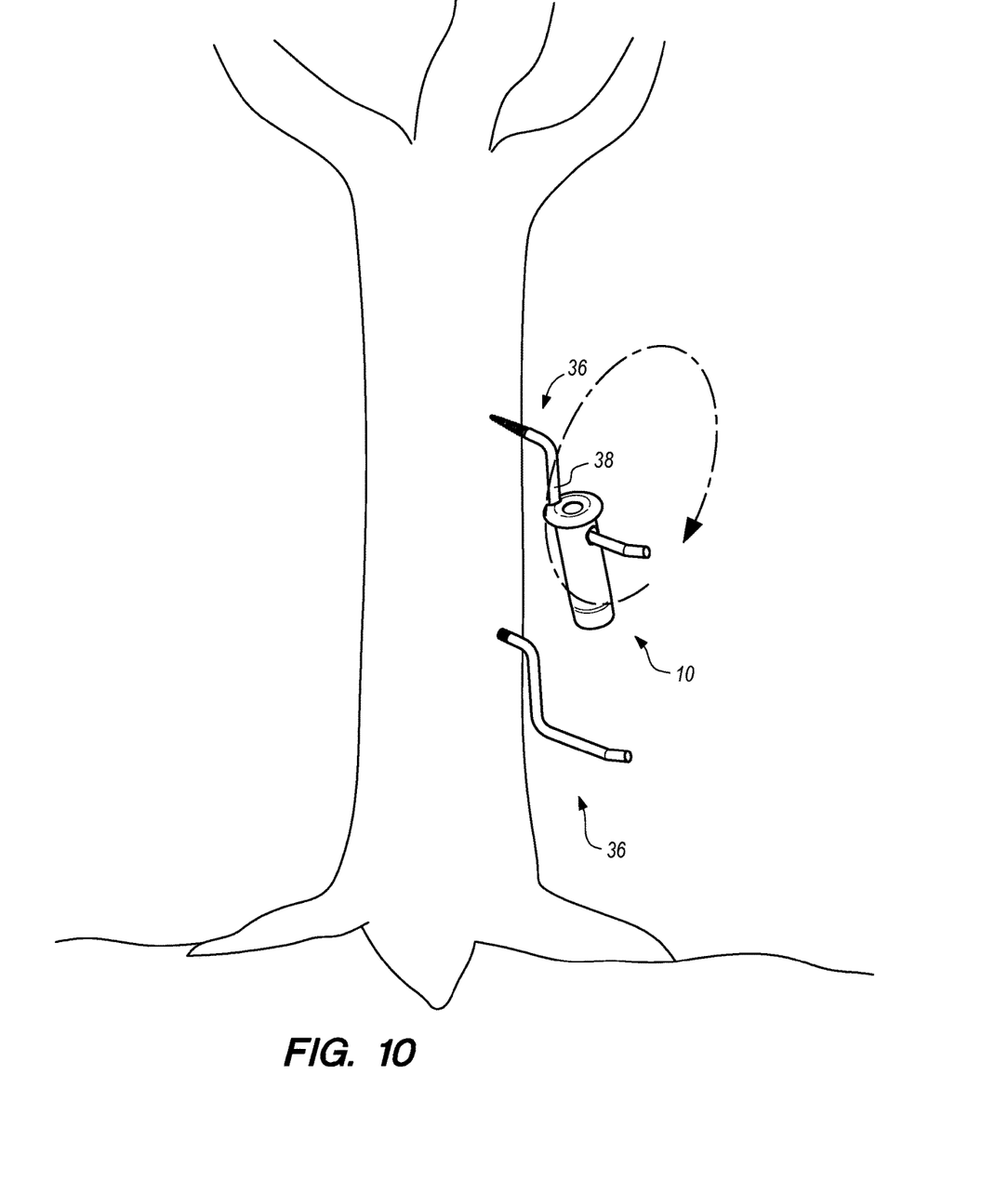
FIG. 10 is a view of the tool being used to screw a tree step into a tree using the configuration shown in FIG. 9.

The slot-and-lock system is comprised of a top slot 16 on one end of the tool 10, and bottom slot 18 that allows the tree step 36 to be configured as shown in FIG. 8. The purpose of this feature is to allow the tool to be used as a source of additional leverage through adding usable length from the applied force to the point of rotation on the step.

The sloped protruding lip face 20 is intended to provide additional clearance for the user's hand from contacting the step 36 during operation should any slight overhang of the hand, garment, or knuckles occur. This protects the hand from sliding up against the lever portion 38 of the tree step 36. This additional protection allows the user to safely apply more force to the tree for quicker installation of the step 36.

The palm swell 22 is intended to provide the user with a more comfortable and ergonomic grip geometry. The resulting proper fit with the user's hand reduces fatigue and allows faster installation and removal of steps 36.

The textured handle surface 24 may be comprised of a variety of textures or surface finishes. It is intended to give a more graspable handle surface 24 to allow for more grip on the tool 10 for the user.

The contoured front cavity opening 26 is intended to allow the user to more easily guide the step 36 into the cylindrical cavity 34 by providing a tapered entrance which aligns the step 36 into the cavity 34.

Figure 4:
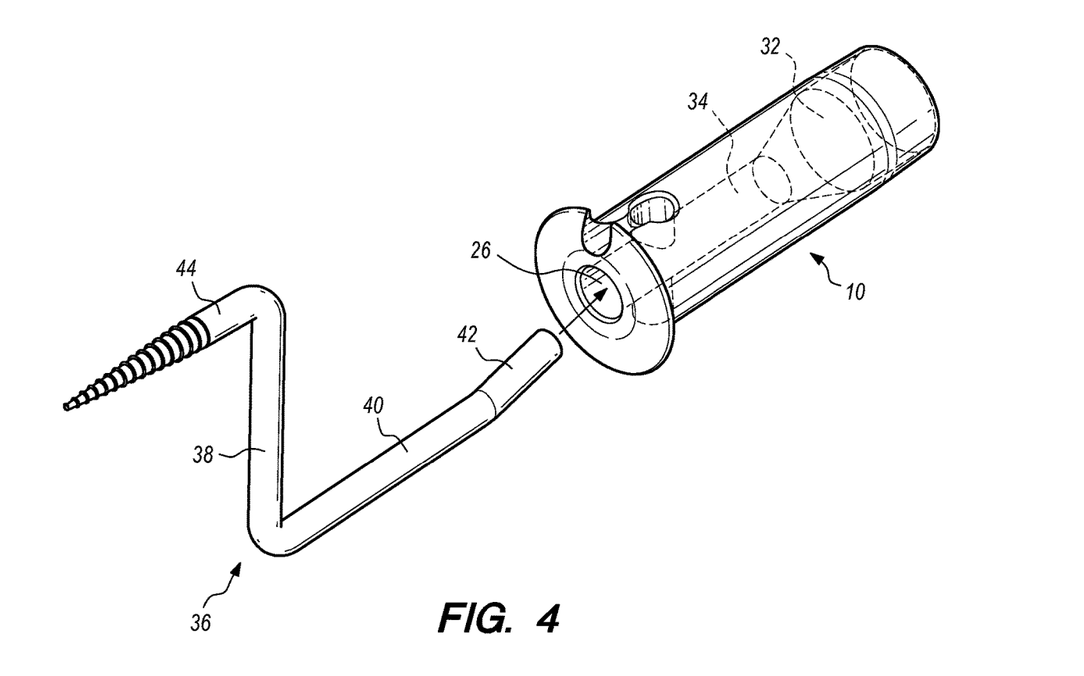
FIG. 4 is a diagram of the tool showing the method of insertion of the platform portion of a tree step into the central cylindrical interior cavity of the tool.
Figure 5:
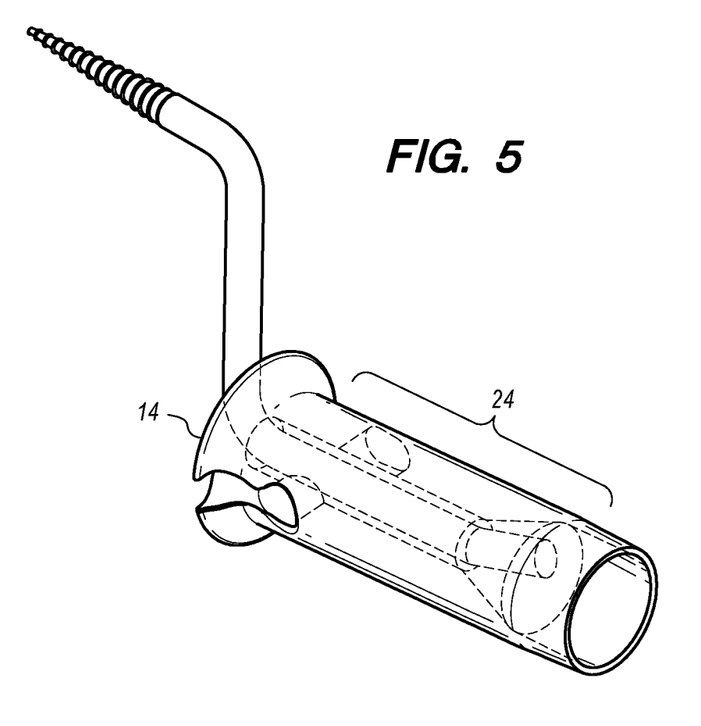
FIG. 5 is a diagram of the tool showing the tree step secured inside the tool using the method of insertion shown in FIG. 4.
Figure 6:
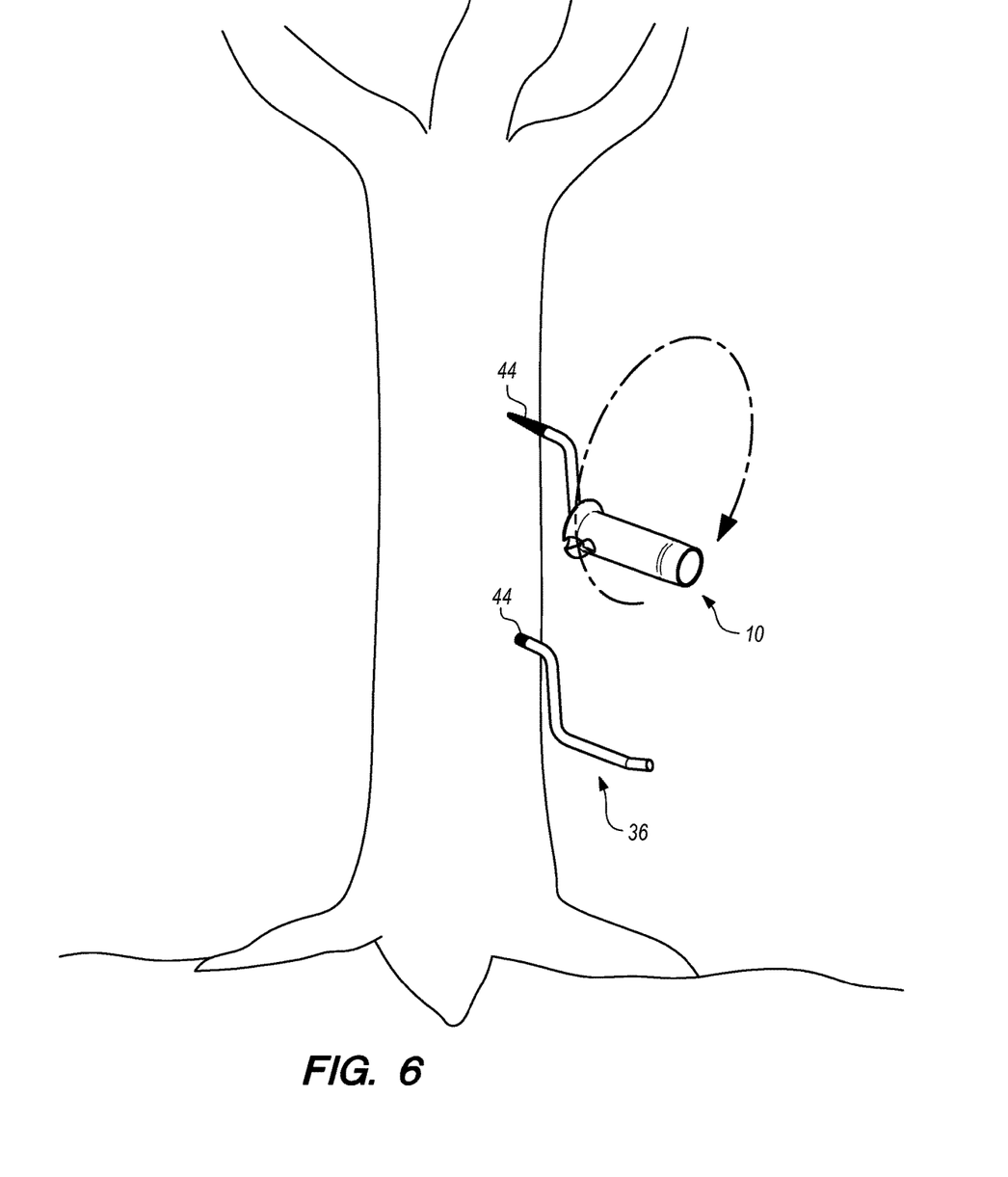
FIG. 6 is a view of the tool being used to screw a tree step into a tree using the configuration shown in FIG. 5.

The first mode of operation is shown in FIGS. 4 through 6. Referring now to FIG. 4, a threaded tree step 36 is separately shown next to the tool 10. The threaded tree step 36 is composed of a lever portion 38, a non-threaded step platform 40 with an off-axis end portion 42, and a threaded end 44. The threaded end 44 of the tree step is designed to screw into the side of a tree, and the non-threaded step platform 40 is designed for the user to stand on once the threaded portion 44 is secured inside a tree.

Now referring to FIG. 6, first the threaded end 44 of a tree step 36 is screwed far enough into a tree by hand so that the step 36 can stick out perpendicularly from the tree while supporting its own weight. Now referring to FIG. 4, the non-threaded platform end 40 of the step 36 is then inserted into the contoured front cavity opening 26, down the cylindrical cavity 34 until the off-axis portion 42 of the step 36 slides into the beveled interior cavity 32. This completed configuration is illustrated in FIG. 5. Once the step 36 is in place inside the tool 10, the user would grasp the tool 10 just behind the raised lip 14, along the handle surface 24. Now referring again to FIG. 6, the user would then press the threaded end 44 toward the tree it has already begun to be threaded into by hand, applying force against raised lip 14, and begin rotating as to thread the step 36 into the tree. Once the step 36 is fully threaded into the tree, the user would slide the tool 10 off of the step 36 leaving only a properly installed tree step 36.

Figure 7:
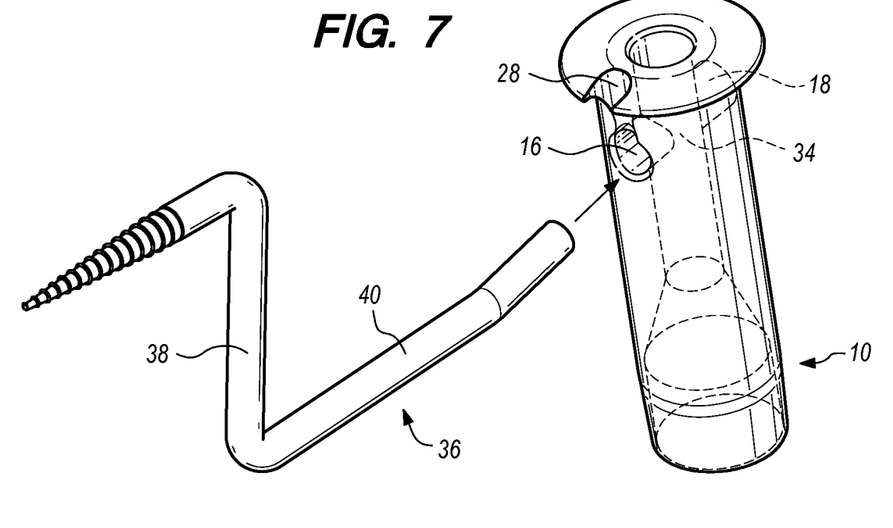
FIG. 7 is a diagram of the tool showing the method of insertion of the platform portion of a tree step into the slot-and-lock system of the tool so as to provide for additional leverage.

The second mode of operation, as illustrated in FIGS. 7 through 10, would be useful in situations where the step has either already been partially threaded into the tree and is too difficult for the user to fully install using the first configuration or else is already fully threaded into the tree and is too difficult for the user to remove using the first configuration. Referring now to FIG. 7, the process of inserting the tool 10 onto a tree step 36 to reach the second configuration is shown. To utilize the second mode of operation, the user would slide the top slot 16 of the slot-and-lock system onto the non-threaded platform end 40 of the tree step 36, allowing the platform end 40 to pass through a portion of the cylindrical cavity 34 and out through the bottom slot 18 of the slot-and-lock system until the lever portion 38 of the step 36 is inside the handle groove 28. This completed configuration is shown in FIG. 8. The user would then rock the bottom of the tool 10 away from the tree, providing clearance for the user's hand and further securing the lever portion 38 inside the handle groove 28 by pressing the lever portion 38 and handle groove 28 against each other, eliminating any clearance between the two parts that might have still existed. Now referring to FIG. 10, in this configuration, the tool 10 thereby effectively extends the lever portion 38 of the tree step 36 and provides added leverage. The user can then continue rotation of the end of the tool 10, threading the step 36 with much less force due to the added leverage. Once the step 36 is fully threaded, the user would then slide the tool 10 off of the step 36 in the reverse fashion as was used to place the tool 10 on the step 36, leaving only a properly installed tree step 36.

The tool 10 is not intended to be left on the step 36 after installation. The tool 10 is not designed to be stood upon, and if used as such, could result in injury or death.

The tool 10 is intended to be operated using one hand, allowing the user to keep a free hand to keep a firm grip on the tree or on previously properly installed steps 36. The user should not attempt to use the tool 10 without being properly secured to the tree with a tether, firm footing, and a solid grip.

In another embodiment of the present invention, a wrist strap is attached to the tool 10 to allow the user to more securely carry the tool 10 and reduce the risk of the tool 10 falling to the ground while the user is in an elevated position.

The embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. An installation tool for a threaded tree step having a lever portion and a platform portion, the tool being operable by a user using only one hand when installing the tree step into a tree trunk, the tool comprising:
   a main body having a handle for the user to grip the tool;
   the main body having an interior cylindrical cavity for inserting the platform portion of the tree step, wherein the lever portion of the tree step is perpendicular to the tool;
   the main body having a beveled interior cavity for holding an off-axis portion of the platform portion of the tree step, wherein a surface of the beveled interior cavity pressing against the off-axis portion keeps the platform portion of the tree step from sliding out of the tool; and
   the main body having a slot-and-lock system comprising two slots for inserting the platform portion of the tree step through the slots and securing the lever portion of the tree step against one of the slots using a groove cut into the main body, wherein the lever portion of the tree step is parallel to the tool.

2. The tool of claim 1, wherein the tool is made of a thermoplastic polymer.

3. The tool of claim 1, wherein the tool further comprises a palm swell and a textured surface on the handle for aiding in the user's grip of the tool.

4. A threaded tree step system, comprising:
   a threaded tree step, comprising:
   a threaded portion for screwing into a side of a tree;
   a perpendicular lever portion for providing leverage in screwing the tree step into the side of the tree; and
   a platform portion operable as a handle for grasping the tree step during climbing and during an installation and removal of the tree step and as a step platform for standing on the tree step;
   an installation tool for the threaded tree step completely operable through single-handed use by a user, the tool comprising:
   a main body having a handle for the user to grip the tool;
   the main body having an interior cylindrical cavity for inserting the platform portion of the tree step, wherein the lever portion of the tree step is perpendicular to the tool;
   the main body having a beveled interior cavity for holding an off-axis portion of the platform portion of the tree step, wherein a surface of the beveled interior cavity pressing against the off-axis portion keeps the platform portion of the tree step from sliding out of the tool; and
   the main body having a slot-and-lock system comprising two slots for inserting the platform portion of the tree step through the slots and securing the lever portion of the tree step against one of the slots using a groove cut into the main body, wherein the lever portion of the tree step is parallel to the tool;
   wherein the user is able to operate the installation tool using only one hand in either a perpendicular or parallel orientation relative to the side of the tree;
   wherein the perpendicular orientation is used when torque is desired for installing or removing the tree step; and
   wherein the parallel orientation is used to provide additional leverage on the tree step when additional torque is desired for installing or removing the tree step.

5. The system of claim 4, wherein the tool is made of a thermoplastic polymer.

6. The system of claim 4, wherein the tool further comprises a palm swell and a textured surface on the handle for aiding in the user's grip of the tool.

7. A method of installing a threaded tree step having a lever portion and a platform portion into a tree by a user using only one hand when installing the tree step into a side of the tree and an installation tool, comprising the following steps:
   screwing the tree step into the side of the tree until the tree step will support its own weight without falling off;
   placing the installation tool over the platform portion of the tree step, the tool comprising:
   a main body having a handle for the user to grip the tool;
   the main body having an interior cylindrical cavity for inserting the platform portion of the tree step, wherein the lever portion of the tree step is perpendicular to the tool;
   the main body having a beveled interior cavity for holding an off-axis portion of the platform portion of the tree step, wherein a surface of the beveled interior cavity pressing against the off-axis portion keeps the platform portion of the tree step from sliding out of the tool; and
   the main body having a slot-and-lock system comprising two slots for inserting the platform portion of the tree step through the slots and securing the lever portion of the tree step against one of the slots using a groove cut into the main body, wherein the lever portion of the tree step is parallel to the tool;
   rotating the tool to further drive the tree step into the side of the tree; and
   removing the tool from the tree step.

8. The method of claim 7, further comprising placing the tool onto the tree step by inserting the tree step into the cylindrical cavity, wherein the tool is operated such that the lever portion of the tree step is perpendicular to the tool.

9. The method of claim 7, further comprising placing the tool onto the tree step by inserting the tree step into the slot-and-lock system, wherein the tool is operated such that the lever portion of the tree step is parallel to the tool.

10. The method of claim 7, wherein the tool is made of a thermoplastic polymer.

11. The method of claim 7, wherein the tool further comprises a palm swell and a textured surface on the handle for aiding in the user's grip of the tool.

\* \* \* \* \*